Sept. 20, 1971 W. H. BARR 3,605,534
BOARD CUTTING MACHINE
Filed May 24, 1967 5 Sheets-Sheet 1
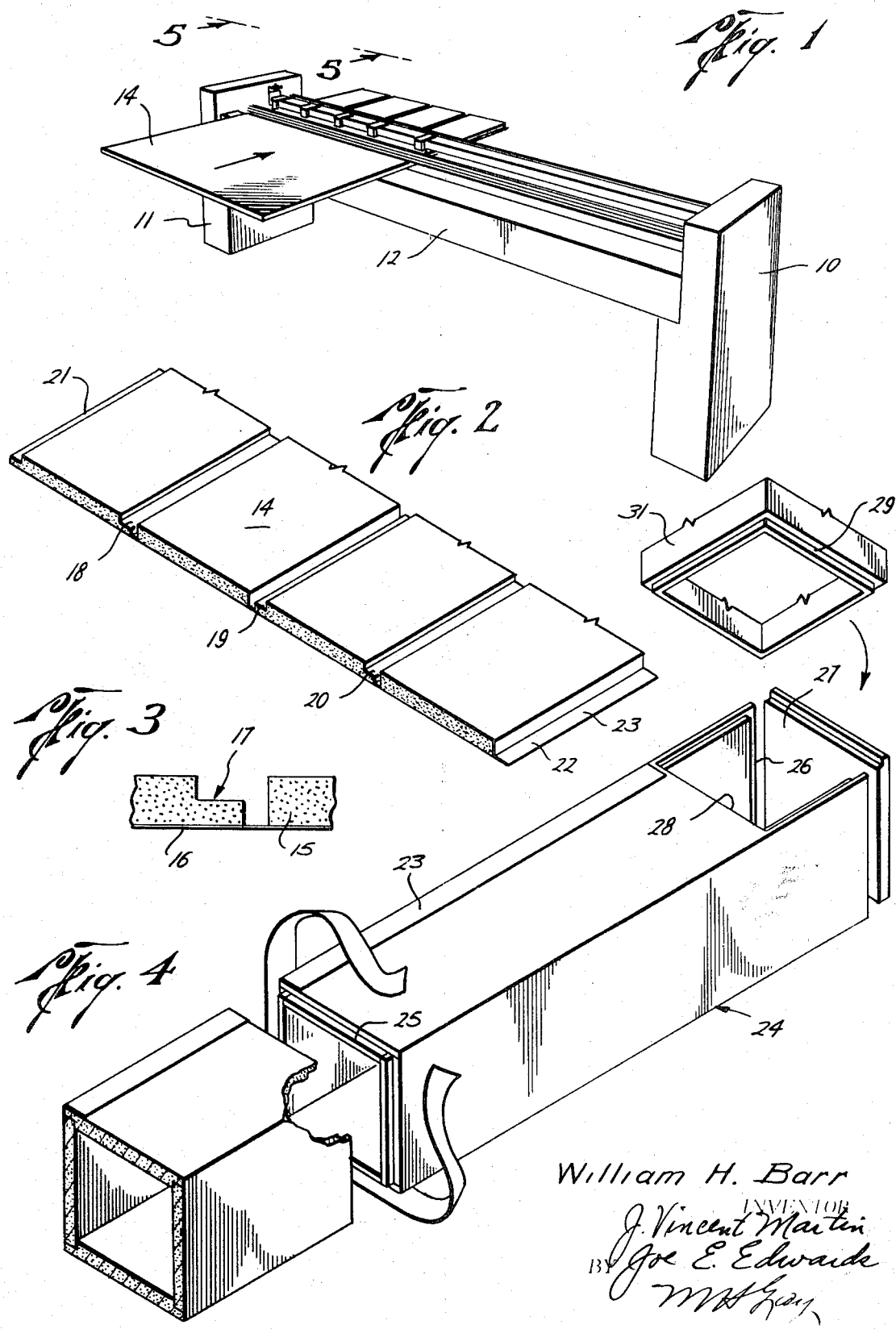
William H. Barr
J. Vincent Martin
Joe E. Edwards
BY
ATTORNEYS Sept. 20, 1971    W. H. BARR    3,605,534
BOARD CUTTING MACHINE
Filed May 24, 1967    5 Sheets-Sheet 2
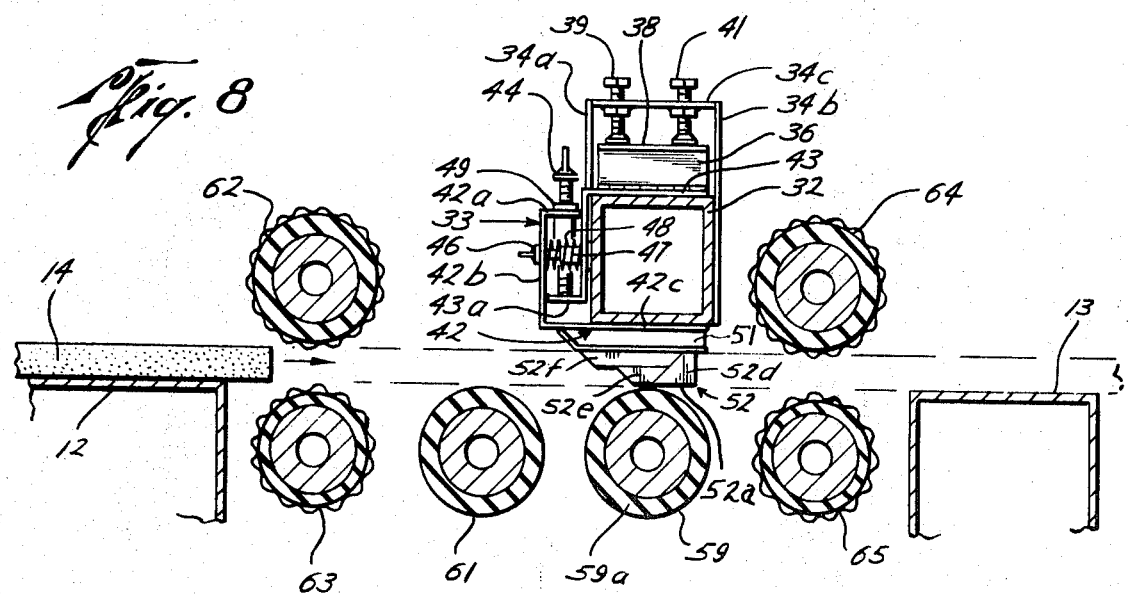
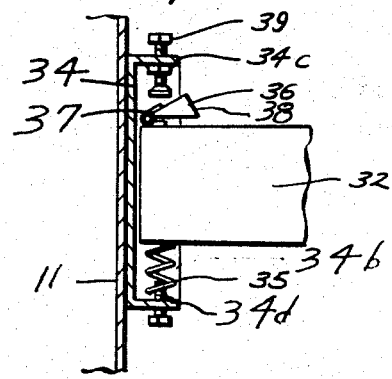
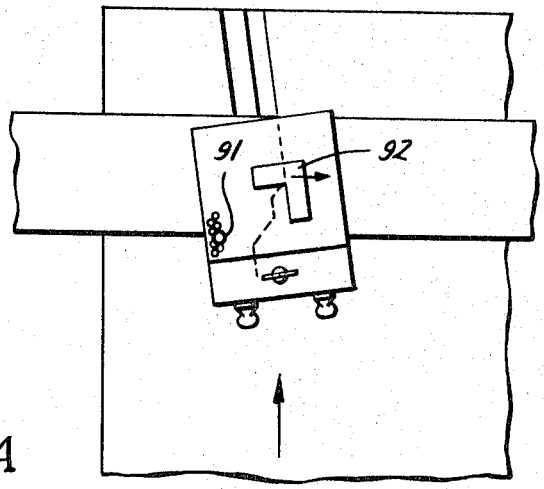
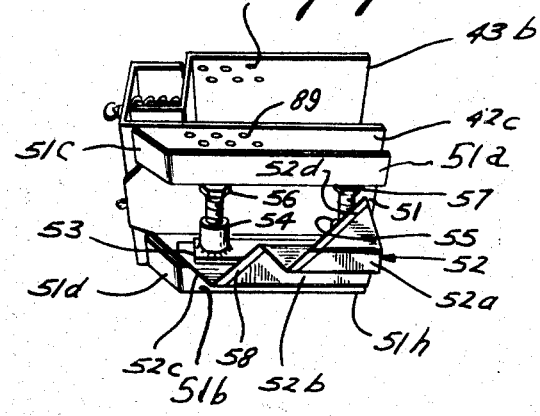
William H. Barr
INVENTOR.
BY J. Vincent Martin
Joe E. Edwards
M. H. Gay
ATTORNEYS

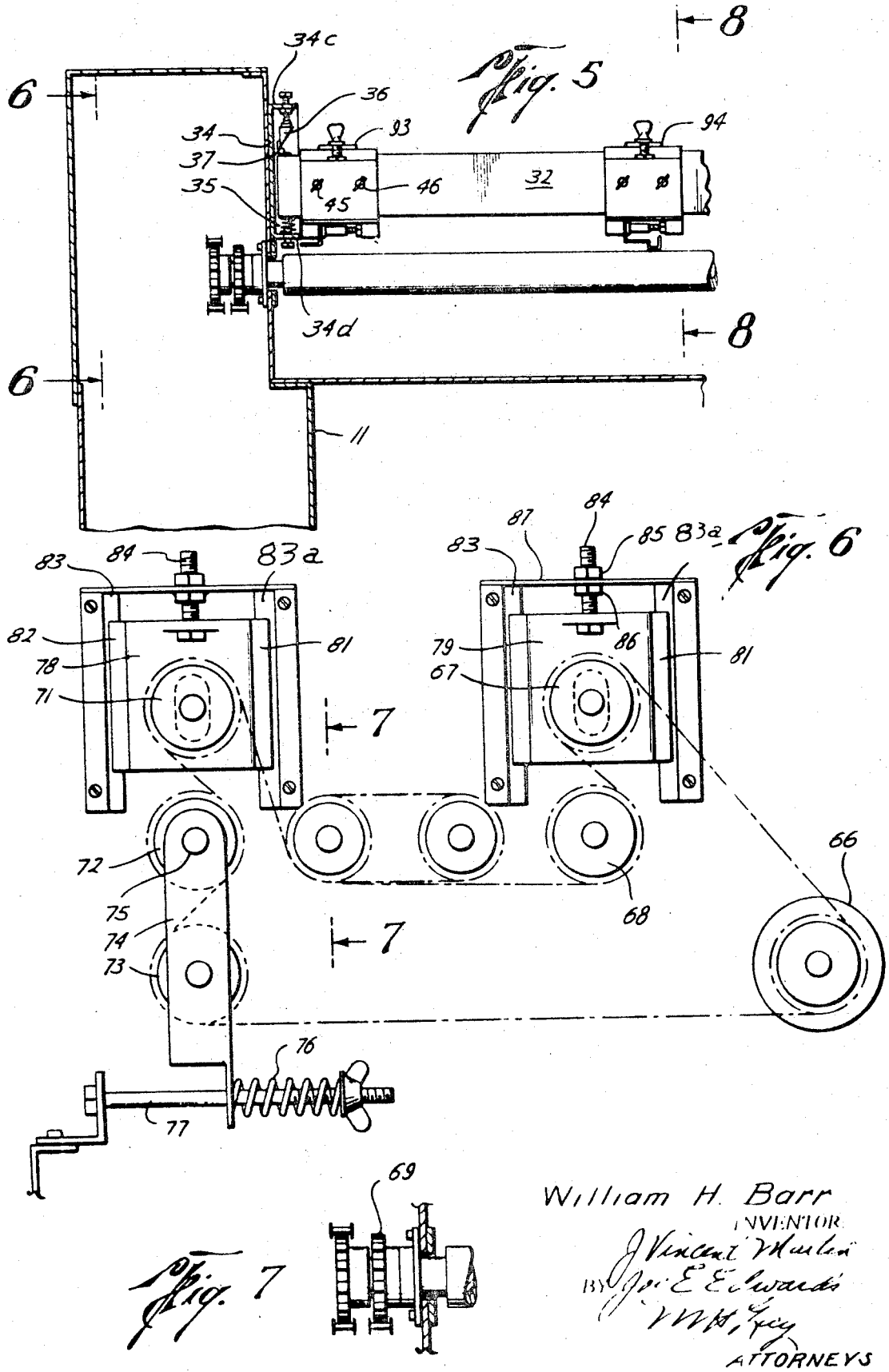

Sept. 20, 1971 W. H. BARR 3,605,534
BOARD CUTTING MACHINE
Filed May 24, 1967 5 Sheets-Sheet 5

William H. Barr
INVENTOR.
BY J. Vincent Martin
Joe E. Edwards
M. H. Gay
ATTORNEYS United States Patent Office 3,605,534
Patented Sept. 20, 1971

3,605,534
BOARD CUTTING MACHINE
William H. Barr, 8418 Broadway,
San Antonio, Tex. 78209
Filed May 24, 1967, Ser. No. 640,948
Int. Cl. B26d 3/06
U.S. Cl. 83—5
16 Claims

ABSTRACT OF THE DISCLOSURE

This invention relates to board cutting machines, and more particularly to machines for forming structures from fibrous board having an impermeable facing on one or both sides. The machine cuts grooves in a board of material which permits the board to be folded into a rectangular form to provide a duct. The board may also be wrapped around any structure for insulation, such as pipe or structural members.

---

Machines have heretofore been used to cut V-shaped grooves in fiber board to form ducts. After the V-grooves are formed, a router or a hand tool has been used to form a shiplap-type joint on one side of the board and to remove fibrous material from the other side to leave a flap of impervious material so that when the duct is formed the joint will be a shiplap joint with a flap to overlap the joint. With the V-type duct using a shiplap closure joint, different pressures are present in the several joints. When not subjected to any external force, these different pressures cause the duct to be nonrectangular. The angles of the sides of the duct may vary several degrees from right angles.

Where V-type duct work is used, a branch duct is not connected to the common duct work. Special fittings must be used to provide a small section in a run of duct with all shiplap joints into which a branch duct can be fitted.

Pressure on a V-type duct may result in opening of the V-grooved corners to the extent that the corner opens up and permits the insulation material to separate. This does not happen in shiplap joints. Negative pressure may also separate the insulation in a V-groove, but not a shiplap groove.

Shiplap-type joints have been cut in the past by simultaneously cutting through the backing material. The mating board would have fibrous material removed by hand to provide a flap for completing the joint.

It is an object of this invention to provide a machine which in a single pass will suitably groove an insulation board while leaving the moisture barrier intact for forming into a duct or insulator which will maintain a rectangular configuration.

Another object is to provide a machine for grooving insulation board for making ducts or insulators in which the end of the board may have a shiplap joint formed thereon which will mate with shiplap surfaces in the side of a run of duct work, after a panel has been removed, to provide branch ducts and 90° turns without special fittings or special tools.

Another object is to provide a machine for cutting duct-forming material to remove substantially all fibrous material along a desired width from the facing on the board to permit proper folding of the board into rectangular duct form.

Another object is to readily remove fibrous material from the edge of a board of duct-forming material to leave a flap of facing for lapping a joint simultaneously with cutting the other joints in the material.

Another object is to provide a machine for forming a duct insulation board in a single pass through the machine which will cut shiplap-type joints without cutting through the facing on the material.

Another object is to provide a machine for removing substantially all fibrous material from duct board while leaving the facing on one side thereof intact.

Another object is to provide a single blade for cutting a groove in insulation board.

Another object is to provide a machine for cutting joints in fibrous insulation board to permit folding of the board into ducts or insulators of consistent shape and size.

Another object is to provide a machine for forming ducts from fibrous insulation board which will form a transition duct to connect ducts of different sizes.

Other objects, features and advantages of the invention will be apparent from the drawings, the specification and the claims.

In the drawings, wherein an illustrative embodiment of this invention is shown, and wherein like reference numerals indicate like parts:

FIG. 1 is a perspective view of a machine constructed in accordance with this invention grooving a board to be formed into a duct or insulator;

FIG. 2 is a diagrammatic view of a fragment of a board cut by the machine of FIG. 1 which when folded will give a square duct;

FIG. 3 is a sectional view through a fragment of board for forming ducts showing one of the joints;

FIG. 3A is a diagrammatic view of a cutter for forming the cut shown in FIG. 3;

FIG. 4 is an exploded diametrical view of fragments of a duct with parts broken away illustrating joints in a run and a 90° bend;

FIG. 5 is a view along line 5—5 of FIG. 1 showing a portion of the machine in vertical elevation and a portion of the machine in vertical cross-section;

FIG. 6 is a partial view along line 6—6 of FIG. 5 on an enlarged scale showing the drive mechanism for the machine and the mounting thereof;

FIG. 7 is a fragmentary view along the line 7—7 of FIG. 6 illustrating the double sprocket on this roller;

FIG. 8 is a view along the line 8—8 of FIG. 5 illustrating the relationship of the rollers and cutter;

FIG. 9 is a fragmentary view partially in vertical cross-section and partially in elevation illustrating the mounting of the cutter support;

FIG. 10 is a fragmentary bird's eye view of a cutter traveling along its support as a board of material passes through the machine to make a transition or diagonal cut in the board;

Figure 16A:
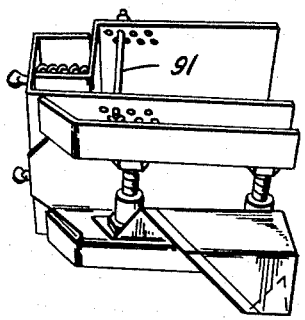
Figure 16:
Figure 17:
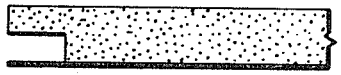
Figure 17A:
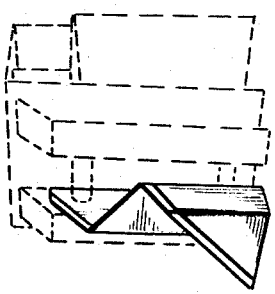
Figure 18:
Figure 18A:
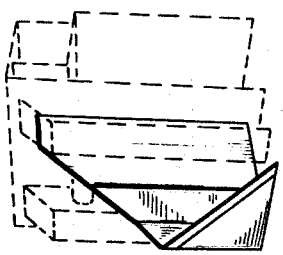

In like manner, FIGS. 12 through 18 and their associated FIGS. 12A through 18A illustrate other cuts which may be made in board and the associated cutter for forming these cuts, with FIG. 16A shown in its entirety in full lines and showing the means for causing the cutter to travel along its support and make a diagonal cut in the board.

Figure 19:
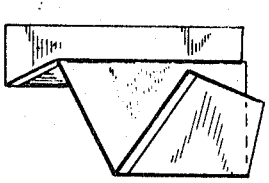

FIG. 19 is a diagrammatic view of a V-type knife blade constructed in accordance with this invention.

Referring first to FIG. 1, the illustrated machine includes supporting legs or columns 10 and 11 held in spaced relationship by a table top 12 and a table top 13 (FIG. 8). The upper surface of the table tops 12 and 13 provide a guide surface for a board of fibrous material 14 passing through the machine.

The board of material 14 may be any suitable material which will serve as insulation for duct work, and includes a facing on one or both sides thereof. For instance, there is presently available from the Owens-Corning Fiberglas Corporation an insulation board made of fiberglass held by a suitable binder known as "Duct Board." On one face of the board there is provided an impervious facing which may be aluminum foil, aluminum foil with a fiberglass mat, or aluminum foil, a fiberglass mat and a vinyl sheet. It will be appreciated that the machine of this invention can be used with any suitable insulation material having a facing thereon. In FIG. 3, the fiberglass material is shown at 15 and the facing at 16.

In accordance with this invention, the passing of the board 14 through the machine will result in shiplap or other suitable cuts which will remove substantially all of the fiberglass and binder therefor from a desired area such as indicated generally in the cut shown at 17 in FIG. 3. As shown in FIG. 2, a board may have three shiplap cuts formed therein, such as 18, 19 and 20. An additional shiplap cut may be provided in the end as at 21 and material removed from the other end as at 22 to leave a flap 23 of facing material. When the thus formed board is folded into rectangular configuration with the facing material on the exterior, it will assume the shape shown in FIG. 4, and the flap 23 will overlap the shiplap joint 21. By suitably taping the flap 23 in position, or by sticking it to the underlying facing material with a suitable bonding agent, a firm, rigid, rectangular duct such as shown at 24 in FIG. 4 will result.

After the board 14 has been cut, it may be turned 90° and two shiplap cuts made in the end face thereof, preferably one male and the other female. This is shown in the duct 24 in FIG. 4 with the male shiplap joint at 25 and the female at 26. If desired, a closure plate 27 may be fabricated to close the end of the duct.

If it is desired to turn a 90° corner, or to take a branch duct off a main duct, such as at 24, a window may be provided by cutting the duct 24 along the line 28 and removing the end piece. The removed piece will provide the closure plate 27. If the branch duct is not at the end of a run, two cuts will be made spaced by the width of the branch duct to be inserted. The shiplap joints on the run of duct work 24 will cooperate with the male shiplap joint 29 on the branch duct 31 to position the branch duct in the main duct 24. Suitable taping of the joint will complete the joinder of the branch and main duct.

Reference is made to FIGS. 5 through 9 to show the construction of the machine.

The machine includes a support 32 on which a plurality of cutters indicated generally at 33 are mounted. The support 32 may take any desired form. The box section is preferred to permit use of light material, as the support is supported only on each end and may be up to ten feet or more in length.

To facilitate removal and replacement of the cutters, the bar is mounted with a quick release mechanism which permits the bar to be moved upwardly. One of these mechanisms is provided at each support pillar 10 and 11. A base member 34 is suitably secured to the upright 11 in any desired way such as welding, bolting, etc. The base plate has vertically extending out-turned flanges 34a and 34b on each side as shown in FIG. 8. Similar flanges 34c and 34d are provided at the top and bottom of the base member 34. The side flanges 34a and 34b hold the support 32 against horizontal movement.

The support 32 rests on a pair of springs 35 which are mounted side by side on the flange 34d. These springs, one of which is shown in FIG. 5, underlie opposite sides of the support 32.

To releasably latch the support in place, it has a lock member 36 hinged to its upper surface by hinge 37. The member 36 has an upper flat face 38. A pair of spacing studs 39 and 41 extend through the upper flange 34c and engage the flat face 38 of the lock member 36. It will be appreciated that adjustment of the screws 39 and 41 determine the vertical position of the support 32. By pressing down against the resistance of springs 35, the lock member 36 may be freed and turned downwardly onto the top of support 32, thus giving a space between the lock member and the stop studs 39 and 41 which will permit the support to be raised by springs 35, or other means, to provide additional room for handling of the cutters 33. FIG. 9 shows the release position.

The cutters 33 may have any desired means for positioning them on the support 32. For example, the cutters 33 may have a carrier which includes a J-shaped lower member 42 and a Z-shaped upper member 43. A stud 44 is threaded through the short leg 42a of the J and engages leg 43a of the Z-shaped member. A pair of studs 45 and 46 extend through the base 42b of the J-shaped member and are threadedly received in nuts 47 which are secured to the Z-shaped member. Suitable small springs 48 surround the stud and nut to urge the Z-shaped member away from the J-shaped member. The studs 46 have a loose fit with the base 42b of the J-shaped member, and thus tightening of the stud 44 in its nut 49 will clamp the carrier onto the support 32. It will be appreciated that the structure just described is a simple, inexpensive method of clamping the carrier to the support 32, and any suitable system could be employed.

The carrier has welded to the bottom or long leg 42c of the J-shaped member an inverted channel 51 having out-turned flanges 51a and 51b (see FIG. 3A). On the front side the flanges are separated from the remainder of the channel and bend upwardly as at 51c and 51d. Thus a sleigh-like member is formed to avoid any possibility of the board 14 hanging up on the channel member.

A suitable knife blade indicated generally at 52 is held between the legs of the channel member 51 by a locking arrangement. This locking arrangement includes a bar 53 having nuts 54 and 55 welded thereto. Suitable studs 56 and 57 are threaded into the nuts 54 and 55, respectively. Thus by positioning the knife blade in place and the locking mechanism between the channels and backing off the studs 56 and 57 until they jam between the legs of the channel member, there results a locking of the knife blade in place.

The knife blade is a thin blade of any suitable metal, such as steel, having a cutting edge 58.

It will be appreciated that the support 32 is a beam supported from each end. Desirably, the support 32 is free of any additional support. The carriers 33 are fabricated from thin commercial plate. As it is desirable to avoid the necessity of holding close tolerances on these parts, some means is preferably provided for relating the knife blade 52 to the board 14 as it passes through to be certain that the knife is correctly positioned. The means for relating the knife blade and the board is provided by a blade support means which cooperates with the blade to position and hold the blade in the desired relationship to the board. This blade support means may take any desired form which provides a support for the blade.

Preferably the blade support means helps to avoid tearing or bunching up of the facing material. Thus, it is preferred that a roller 59 be utilized to avoid any tendency of the blade support means to interfere with free passage of the facing material over the blade support means. It is further preferred that the blade support roller 59 have a peripheral speed which is slightly greater than the speed of the board 14 passing thereover. This will tend to avoid any tendency of the facing material to bunch up, as it will be held taut as it passes under the knife.

The knife blade 52 is specially designed to cooperate with the blade support 59. This special design includes a section of the blade 52a which extends horizontally or parallel to the plane of movement of the board across the machine. Thus the section of the blade 52a lies in a plane tangent to the roller 59 and provides a bearing area.

The support roller 59 is mounted in journals at opposite ends of the machine in the legs 10 and 11. Thus, the support roller, being supported at each end, will act as a beam in the same manner as the cutter support 32. In order to compensate for differences in bending of the cutter support 32 and the support roller 39, as well as tolerances in the structure, one of the supports 59 and the blade 52 is provided with resilient means which prevents the blade support means from exerting excessive force on the section 52a of the knife blade. Preferably this resilient means is provided by section 52b of the knife blade. Section 52b extends generally transverse of the machine or horizontally. In other words, some portion of the knife between the section 52a and the mounting of the knife to the carrier 33 extends in some direction other than normal to the plane of the section 52a. Preferably, this is provided by the section 52b which extends generally horizontally, but it will be appreciated that any configuration which provides some portion of the blade which is not normal to the surface 52a will permit the knife to bend and act in the manner of a spring so that excessive pressure cannot be applied to the knife through the support roller 59. With the spring action defined above, the lowermost portion of the knife blade, which will remove the fibrous material adjacent the facing, is correctly positioned for this task, and yet is free to give sufficiently to permit the facing material to pass between the knife blade and the support means.

In accordance with this invention, the cutting edge on the knife blade extends rearwardly from the point at which a cut is begun. Thus the cutting edge extends rearwardly from the point 52c which first engages a board to be cut. The cutting edge extends rearwardly in a continuous manner, no matter what direction it may take otherwise to perform the desired cutting action in the fibrous material. This eliminates any change in direction of the cutting edge which might result in fibers stacking up in the change of direction junction. Also, the end 52d of the knife blade is free from the carrier. If it were attached to the carrier, it would be possible for the fibrous material to tend to hang up at the end of the blade at the point of attachment. By leaving the end of the blade free, this problem is overcome.

The positioning of the support means 59 in the fore and aft direction of the machine relative to the section of the knife blade 52a which it supports is important. If it is positioned too far forward, it will interfere with the facing material moving under the knife blade. If it is positioned too far to the rear, the knife blade may possibly raise up and increase the distance between the portion 52a of the blade and the support means 59, and leave an excess amount of fibrous material on the facing material. Thus, the support means at the point where it engages the knife blade section 52a, with no board 14 in place, should be about 1/8" to 1/4" rearwardly of the frontmost cutting edge of the section 52a of the knife blade. A greater distance could be used, but it would not give as satisfactory results as when the point of engagement is as defined above. It will be appreciated that the support means 59 could engage the knife blade at a much further position to the rear, as engagement at any point will perform the function of holding the knife blade in the proper position. It will permit, however, the fiber board to raise up a slight distance and leave a slight amount of fibrous material on the facing material. While this is not the preferred product, it is an acceptable product as this slight amount of material can be hand-cleaned or, if not too great, can be tolerated as the fibrous material will give when the duct work is folded into a rectangular shape.

It will be appreciated that with the form of carrier and knife blade illustrated, room is needed to withdraw the carrier toward the front of the machine to remove it from the bar. In order to support and guide the board of material being worked on in this space, a guide roller 61 is provided. Like roller 59, guide roller 61 is turned at a rate such that its peripheral speed is slightly greater than the speed of the board 14 passing therethrough so that its tendency is to bend the front end of the board upwardly, thus holding it in proper position for introduction into the knife.

Means are provided for passing the board of fibrous material 14 through the machine. Preferably this means is a pair of lead feed rollers 62 and 63 with the peripheral surfaces thereof fluted to firmly grip the board and pass it through the machine. A pair of trailing rollers 64 and 65 grip the board after it has passed through the knife 52 and pull it through the machine. These rollers also have fluted surfaces. It will be appreciated that the rollers 65, 59, 61 and 63 are positioned so that their uppermost surfaces lie in a common plane.

Reference is now made to FIGS. 5, 6 and 7 wherein the drive mechanism for the rollers is shown. A suitable motor 66 drives the several rollers through a chain which passes over a sprocket 67 on roller 62, thence over a sprocket 68 on roller 63, and thence over a sprocket 69 (FIGS. 5 and 7) on the support roller 59. From this point the chain trains over a sprocket 71 on the trailing feed roller 64 and a sprocket 72 on the trailing roller 65. The chain then passes over idling sprocket 73 and returns to the motor in continuous fashion. To maintain the chain taut, sprocket 73 is carried by an arm 74 which is pivotally mounted at 75 on the same axis as sprocket 72. The arm is urged in a direction to tighten the chain by a spring 76 held in compression on rod 77 which is suitably fastened to the support 11.

In order to provide for vertical adjustment of the top feed rollers 62 and 64, they are journalled in vertically movable supports 78 and 79. These supports have channels 81 and 82 on opposite sides thereof which slide on flanges 83 and 83a. Suitable bolts 84 are carried in the members 78 and 79 and by movement of the nuts 85 and 86 the bolt is positioned relative to flanges 87 through which the bolts pass to selectively adjust the position of the top rollers.

Reference is now made to FIGS. 11 and 11A through 19. These figures show cutters which have blades 52 of different configuration than that shown in FIG. 3A. FIGS. 11 and 11A through 18 and 18A show the particular blades and the particular cuts which they make in board to permit any desired type of operation in forming duct work from board with a facing thereon. FIG. 19 shows a V-type blade in accordance with this invention. This blade may be used for special situations, such as removing V-shaped material to permit the board to be wrapped about a pipe. It will be appreciated that the blades might additionally take other configurations if desired.

Figure 11A:
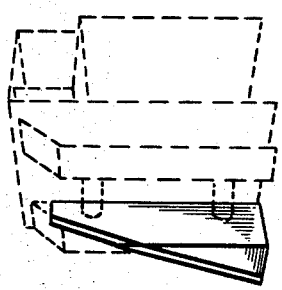
FIG. 11A is a diagrammatic view partially in full lines and partially in phantom illustrating the cutter for making this cut.
Figure 11:
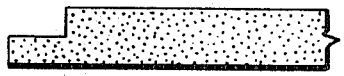
FIG. 11 shows a particular cut which may be formed in a board.
Figure 12A:
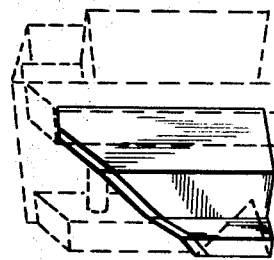
Figure 12:
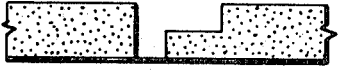
Figure 13:
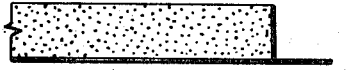
Figure 13A:
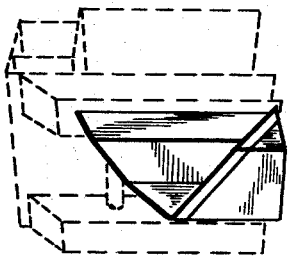
Figure 14:
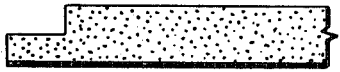
Figure 14A:
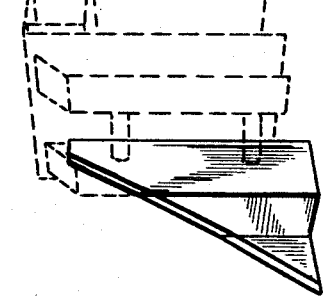
Figure 15A:
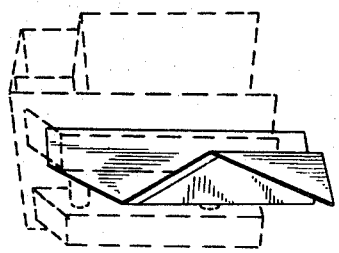
Figure 15:

It might be noted that the blade in FIGS. 11A, 14A and 15A do not have a portion which lies adjacent the support roller 59. As shown in FIG. 5, blades of this type are spaced upwardly from the support roller and no cut is made close to the facing. These types of blades are used at the extremities of the board. As they are not cutting close to the facing material, their positioning is not too critical.

In some instances, it is desirable to make a duct which changes size. For this purpose, a plurality of holes 88 are provided in leg 43b of the Z-shaped portion of the carrier, and similar holes are provided at 89 in the leg 42c of the J-shaped member of the carrier. These holes are provided to receive a cylindrical pin 91 (FIGS. 10 and 16A). With the pin in position in the desired hole, the carrier is placed on the support bar 32 but is not clamped in place. The clamps are tightened sufficiently to hold the knife in proper position but not sufficiently to prevent the carrier from moving along the support bar 32.

It will be noted that each knife has a section which extends in a vertical plane across the machine. Thus, when the pin 91 is not in place, this vertical section of the knife extends parallel to the direction of travel of the board 14 through the machine. In FIG. 8, these are three such vertical sections 52d, 52e and 52f. When the carrier is held at a slight angle to a perpendicular to the support member 32, these blade sections also extend at an angle to the direction of travel of the board and, as they pass through the board, they will cause the carrier to move along the support 32 and make a diagonal cut in the board. By the use of the traveling cutters, shiplap grooves may be formed in a board which, when folded into rectangular form, will have one end which is of a different size than the other end.

It might be noted that on top of the carrier in FIG. 10 there is shown a block 92. This block is fastened to the top surface of leg 43b of the Z-shaped member and is used as a measuring point to measure the distance between the several cutters. The block may take any desired shape and may be positioned relative to the particular knives used to facilitate measurement. Similar blocks are also shown at 93 and 94 on the two cutters shown on FIG. 5. It is omitted from the cutter of FIG. 8 for clarity of the drawings.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A cutting machine comprising,
   a support,
   a cutter on said support,
   means for feeding a board of fibrous material having a facing on at least one side thereof across the cutter from the front to the rear of the machine,
   said cutter having knife blade means which is formed to produce the desired cut in a board and includes a section extending parallel to the plane of movement of the board across the machine,
   and blade support means effective on said parallel extending section of said blade means to support said section while permitting the facing on a board being cut to pass between the blade support means and said section of the blade means,
   said blade support means underlying said section of said blade means,
   one of said knife blade means and said blade support means including resilient means preventing said blade support means from exerting excessive force on said section of said knife blade means, 2. A cutting machine comprising,
   a support,
   a cutter on said support,
   means for feeding a board of fibrous material having a facing on at least one side thereof across the cutter from the front to the rear of the machine,
   said cutter having knife blade means which is formed to produce the desired cut in a board and includes a section extending parallel to the plane of movement of the board across the machine,
   and blade support means effective on said parallel extending section of said blade means to support said section while permitting the facing on a board being cut to pass between the blade support means and said section of the blade means,
   said blade support means underlying said section of said blade means in an area just rearwardly of the forwardmost point of the cutting edge on said section,
   one of said knife blade means and said blade support means including resilient means preventing said blade support means from exerting excessive force on said section of said knife blade means.

3. A cutting machine comprising,
   a support,
   a cutter on said support,
   means for feeding a board of fibrous material having a facing on at least one side thereof across the cutter from the front to the rear of the machine,
   said cutter having knife blade means which is formed to produce the desired cut in a board and includes a section extending parallel to the plane of movement of the board across the machine,
   said knife blade means having a cutting edge extending rearwardly of the machine along its entire length from a point at which the cut in a board is commenced,
   and blade support means effective on said parallel extending section of said blade means to support said section while permitting the facing on a board being cut to pass between the blade support means and said section of the blade means,
   said blade support means underlying said section of said blade means in an area just rearwardly of the forwardmost point of the cutting edge on said section,
   one of said knife blade means and said blade support means including resilient means preventing said blade support means from exerting excessive force on said section of said knife blade means.

4. The machine of claim 1 wherein a plurality of cutters are mounted on said support.

5. The machine of claim 3 wherein means are provided for causing said cutter to travel along said support in response to movement of a board through the machine.

6. A cutting machine comprising,
   a support,
   a cutter on said support,
   means for feeding a board of fibrous material having a facing on at least one side thereof across the cutter from the front to the rear of the machine,
   said cutter having knife blade means which is formed to produce the desired cut in a board and includes a section extending parallel to the plane of movement of the board across the machine,
   said knife blade means having a cutting edge extending rearwardly of the machine along its entire length from a point at which the cut in a board is commenced,
   a support roller underlying and supporting said section of said knife blade means at an area rearwardly of the foremost point of the cutting edge on said section while permitting the facing on a board being cut to pass between the roller and said section of the knife blade means,
   said knife blade means including resilient means preventing said roller from exerting excessive pressure on said section of said knife blade means.

7. The machine of claim 6 wherein the peripheral surface of said roller travels at a rate slightly greater than a board fed by said feeding means.

8. The machine of claim 6 wherein a guide roller is positioned immediately forward of said support roller and the peripheral surfaces of both said guide roller and support roller travel at a rate slightly greater than a board fed by said feeding means.

9. A cutting machine comprising,
   a support,
   a plurality of cutters on said support,
   a pair of front feed rollers and a pair of rear feed rollers on opposite sides of said support for feeding a board of fibrous material having a facing on at least one side thereof across the cutters,
   each cutter including a knife blade mounted on a carrier,
   said knife blade having a first section extending parallel to the plane of movement of the board across the machine for cutting fibrous material from the facing and a second section between the carrier and first section which is not perpendicular to the first section to give resiliency to the knife blade,
   a guide roller between the front feed rollers and the plurality of cutters for guiding the board to said knife blades,
   a support roller underlying and supporting said first blade section while permitting the facing on a board being cut to pass between said support roller and said second blade section,
   the surface of said roller supporting said second blade section lying in an area just rearwardly of the forwardmost portion of said first blade section.

10. The machine of claim 9 wherein the cutting edge on said knife blade extends rearwardly of the machine along its entire length from a point at which the cut in a board is commenced.

11. The machine of claim 9 wherein the guide and support rollers run at a faster speed than the feed rollers.

12. The machine of claim 9 wherein means are provided for causing the cutters to travel along said support while making a cut in response to movement of a board through the machine.

13. The machine of claim 9 wherein each blade includes a section extending at a right angle to said first section and generally in the direction of travel of a board through the machine, and means mounting at least one of the carriers for sliding movement along the support with said right angle section extending at an angle to the direction of travel of a board through the machine whereby the right angle section will cause the carrier to travel along the support while making a cut.

14. As a subcombination a cutter for cutting a fibrous board having a facing on at least one side thereof comprising, a carrier having a clamping surface, a knife blade mounted on the carrier, said knife blade having a first section extending parallel to the plane of movement of a board across the knife blade surface for cutting fibrous material from the facing and a second section between the carrier and first section which is not perpendicular to the first section to give resiliency to the knife blade, said knife blade having a cutting edge beginning adjacent its mounting on the carrier at the front end of the carrier and extending toward the rear of the carrier along the entire length of the blade.

15. The cutter of claim 14 wherein the knife blade at the rearmost end of the cutting edge is spaced from the carrier.

16. As a subcombination, a cutter for cutting a fibrous board having a facing on at least one side thereof comprising, a carrier having means for fastening the cutter to a machine for cutting board, a knife blade mounted on the carrier, said knife blade having a first section extending parallel to the plane of movement of a board through the machine for cutting fibrous material from the facing and a second section between the carrier and first section which is not perpendicular to the first section to give resiliency to the knife blade.

References Cited

UNITED STATES PATENTS

| | | | |
|---|---|---|---|
| Re. 11,365 | 9/1893 | Saltzkorn et al. | 83—5 |
| 810,971 | 1/1906 | Palmer | 83—4 |
| 2,436,111 | 2/1948 | Lowe | 83—5X |
| 2,565,400 | 8/1951 | Skeoch | 83—5 |
| 3,242,780 | 3/1966 | Ried et al. | 83—5 |

FRANK T. YOST, Primary Examiner

U.S. Cl. X.R.

83—428, 436, 579, 662, 698